United States Patent [19]

Kim

[11] Patent Number: 5,703,647
[45] Date of Patent: Dec. 30, 1997

[54] APPARATUS FOR ENCODING/DECODING A VIDEO SIGNAL

[75] Inventor: Sang-Ho Kim, Seoul, Rep. of Korea

[73] Assignee: Daewoo Electronics, Co., Ltd., Seoul, Rep. of Korea

[21] Appl. No.: 521,772

[22] Filed: Aug. 31, 1995

[30] Foreign Application Priority Data

Aug. 31, 1994 [KR] Rep. of Korea .................. 94-21675

[51] Int. Cl.⁶ .................................................. H04N 7/30
[52] U.S. Cl. ................................ 348/403; 348/404
[58] Field of Search ............................ 348/403, 404, 348/401, 419, 391; H04N 7/30

[56] References Cited

U.S. PATENT DOCUMENTS

| | | | |
|---|---|---|---|
| 4,302,775 | 11/1981 | Widergren | 348/406 |
| 4,843,466 | 6/1989 | Music | 348/391 |
| 4,894,713 | 1/1990 | Delogne | 348/403 |
| 5,453,786 | 9/1995 | Trent | 348/403 |
| 5,489,942 | 2/1996 | Kawahara | 348/401 |

*Primary Examiner*—Howard W. Britton
*Attorney, Agent, or Firm*—Pennie & Edmonds, LLP

[57] ABSTRACT

A video signal encoding apparatus performs the quantization based on a predetermined quantizer scale, so the picture quality of an encoded video signal can be maintained. The video signal encoding apparatus sequentially stores an input video frame signals and converts a stored video frame signal from the spatial domain into the frequency domain to provide transform data and quantizes the transform data based on a predetermined quantizer scale to provide quantized transform data. The video signal encoding apparatus statistically codes the quantized transform data to produce an encoded video frame signal and temporarily stores the encoded video frame signal in order to transmit the encoded video frame signal at a constant transmission rate and provides a control signal to thereby enable a video frame signal, being stored at the moment when the transmission of the encoded video frame signal is completed, to be transformed.

5 Claims, 2 Drawing Sheets

APPARATUS FOR ENCODING/DECODING A VIDEO SIGNAL

FIELD OF THE INVENTION

The present invention relates to an apparatus for encoding/decoding a video signal; and, more particularly, to an improved encoding apparatus which is capable of effectively transmitting an encoded video signal without causing an overflow of transmission data while maintaining the picture quality of the encoded video signal.

DESCRIPTION OF THE PRIOR ART

In digital video systems such as video-telephone, teleconference and high definition television system, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video codec(coding-decoding) systems as video-telephone and teleconference systems.

Most coding techniques in the low bit-rate video codec system employ two-dimensional DCT(discrete cosine transform), quantization of DCT coefficients, and VLC (variable length coding).

The two-dimensional DCT, which reduces or makes use of spatial redundancies between image data, divides the image data into equal-sized blocks, for example, blocks of 8×8 pixels and converts each of the blocks from the spatial domain into the frequency domain. As a result, one DC coefficient and a plurality of (e.g., 63) AC coefficients are obtained. The DC coefficient of the block reflects the average intensity of the pixels in the block. In general, the video signal in one frame has values ranging from 0 to 255, giving a dynamic range for the DC transform coefficient from 0 to 2040 which can be represented in 11 bits; and a maximum dynamic range for any AC transform coefficient from about −1000 to 1000. This technique is described in, e.g., Chen and Pratt, "Scene Adaptive Coder", *IEEE Transactions on Communications*, COM-32, No. 3(March 1984). By processing such transform coefficient data with a quantizer, zigzag scanning and VLC, the amount of data to be transmitted can be effectively compressed.

In carrying out the quantization of the transform coefficient data, a smaller quantizer step size(or quantization step size) entails a larger amount of data requiring a larger number of code bits for the representation thereof, whereas a larger quantizer step size results in a lower volume of data needing a fewer number of code bits for their representation. And, a larger number of code bits can represent an image more precisely than a fewer number of code bits. Accordingly, there exists a tradeoff between the amount of data or burden thrust upon a transmission channel and the quality of the image transmitted.

A variety of quantizer step size control schemes has been proposed in the art. In these schemes, the quantization step size is derived from a quantizer scale. Such quantizer scale is determined based on the amount of data currently stored in a buffer memory which stores the encoded video signal temporarily and transmits it at a constant transmission rate to thereby prevent an overflow of the transmission data. That is, the quantization step size becomes larger as the data occupancy rate(data remaining in buffer memory/buffer memory capacity) increases.

Therefore, the number of code bits of an encoded video signal varies with the quantizer scale and, as a result, the picture quality of the encoded video signal cannot be kept constant.

SUMMARY OF THE INVENTION

It is, therefore, a primary object of the invention to provide an improved video signal encoding and decoding apparatus, for use in a low bit-rate video codec system, capable of effectively transmitting an encoded video signal without causing an overflow of transmission data without sacrificing the picture quality of the encoded video signal.

In accordance with the present invention, there is provided an encoding apparatus, for use in a video signal encoder, for encoding an input video signal, the input video signal including a plurality of video frame signals, comprising: grabber for sequentially storing the video frame signals on a frame-by-frame basis; transformation block for transforming a stored video frame signal from the spatial domain into the frequency domain to provide transform data; quantization block for quantizing the transform data based on a predetermined quantizer scale to provide quantized transform data; variable length coder for statistically coding the quantized transform data to produce an encoded video frame signal; buffer for temporarily storing the encoded video frame signal in order to transmit the encoded video frame signal at a constant transmission rate; and controller for providing a control signal to thereby enable a video frame signal, being stored in the grabber at the moment when the transmission of the encoded video frame signal is completed, to be transformed at the transformation blocks.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
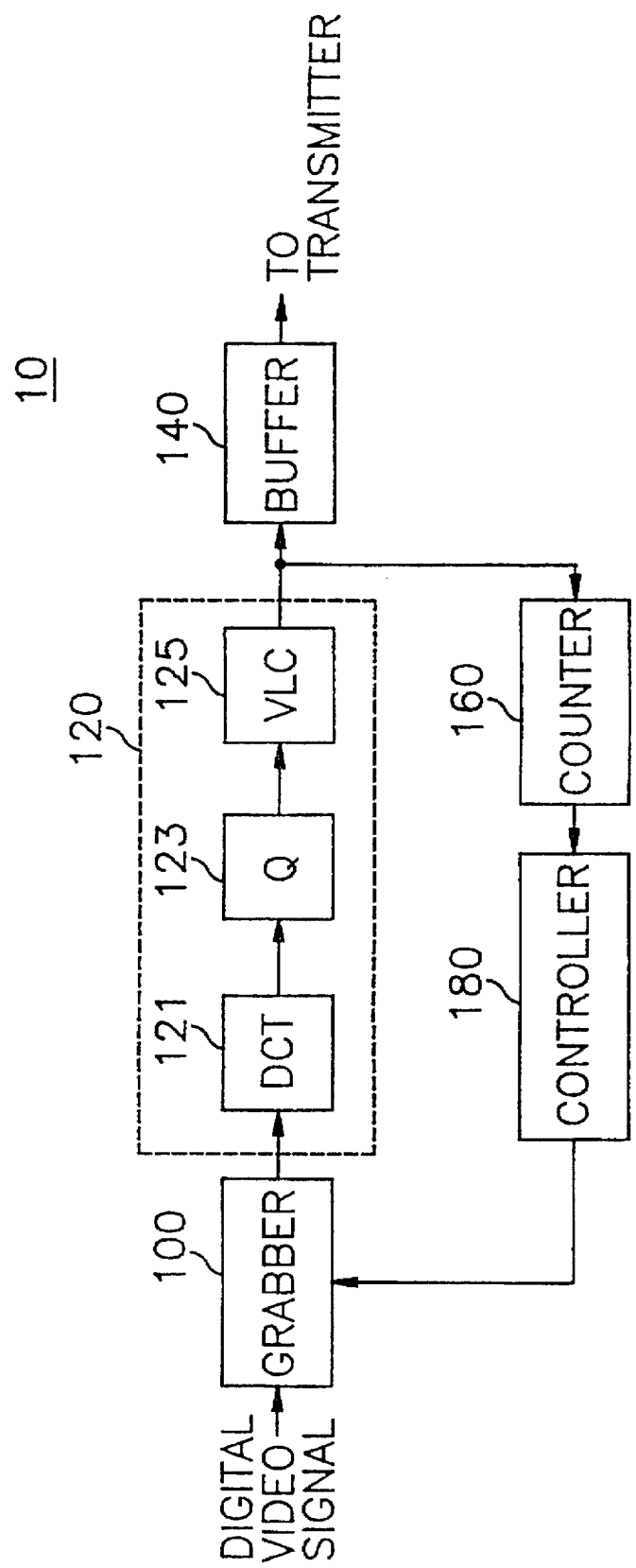
FIG. 1 represents a block diagram of the video signal encoding apparatus in accordance with the present invention.

Referring to FIG. 1, there is shown a block diagram of a video signal encoding apparatus 10 for encoding an input digital video signal in accordance with the present invention, wherein the input digital video signal includes a plurality of video frame signals. A grabber 100 sequentially stores the video frame signal on a frame-by-frame basis. Each video frame signal comprises a multiplicity of equal-sized blocks, for example, blocks of 8×8 pixels.

In response to a control signal from a controller 180, the grabber 100 provides a stored frame signal to a coding block 120.

At the coding block 120, the frame signal retrieved from the grabber 100 is encoded by using a DCT, quantization and entropy coding method. The coding block 120 includes a discrete cosine transform(DCT) block 121, a quantization (Q) block 123 and a variable length coding(VLC) block 125.

The DCT block 121, which converts the video frame signal from the spatial domain into the frequency domain by performing a discrete cosine transform(DCT) process on a block-by-block basis, generates a set of transform coefficients comprising one DC and sixty three AC coefficients for each of the equal-sized blocks of 8×8 pixels.

And the Q block 123 quantizes the sets of transform coefficients for the video frame signal from the DCT block 121 based on a predetermined quantizer scale to provide quantized transform coefficient data to the VLC block 125.

The quantized transform coefficient data and header information representing the initial point of the frame are coded by using an entropy coding method at the VLC block 125 to provide an encoded video frame signal in the form of a bit stream to a buffer 140 and a counter 160.

The buffer 140 stores the encoded video frame signal temporarily and provides it to a transmitter(not shown) for the transmission thereof at a constant transmission rate.

In the meantime, the counter 160 counts the number of the bits of the encoded video frame signal from the coding block 120 and provides the total number of bits(B) thereof to a controller 180.

The controller 180 calculates a time(T) which is required for completing the transmission of the total number of bits(B) as follows:

$$T=B/b$$

wherein b is a mean number of the bits transmitted per second, that is, the constant transmission rate.

Thereafter, the controller 180 provides the control signal enabling the grabber 100 to provide the DCT block 121 with a video frame signal which is stored in the grabber 100 when the time(T) is elapsed from the beginning of the transmission of the encoded video frame signal.

In other words, in accordance with the present invention, video frame signals stored in the grabber 100 during the transmission of the encoded video frame signal are not encoded; and, as a result, the encoded video frame signal can be transmitted without causing an overflow.

Figure 2:
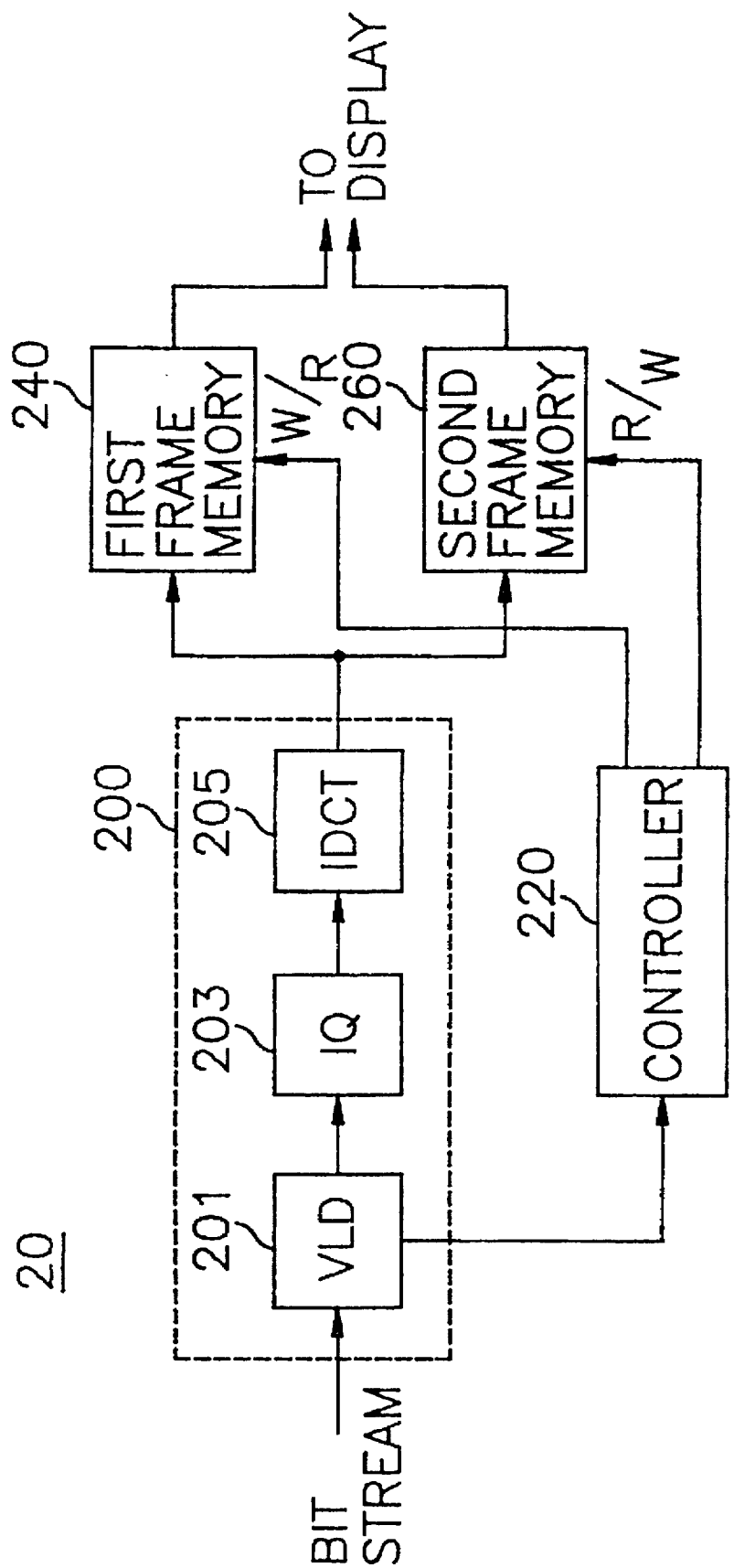
FIG. 2 presents a block diagram of the video signal decoding apparatus in accordance with the present invention.

Referring to FIG. 2, there is illustrated a video signal decoding apparatus 20 corresponding to the inventive video signal encoding apparatus 10 shown in FIG. 1. An encoded video frame signal transmitted from the video signal encoding apparatus 10 is fed to a decoding block 200.

The decoding block 200 includes a variable length decoder(VLD) 201, an inverse quantization(IQ) block 203 and inverse discrete cosine transform(IDCT) block 205.

First, the encoded video frame signal is input into the VLD 201 which serves to decode the encoded frame video signal to provide the quantized transform coefficient data to the IQ block 203, and the header information to a controller 220.

At the IQ block 203, the quantized transform coefficient data is converted back into the sets of transform coefficients. Thereafter, the set of transform coefficients is provided to the IDCT block 205 to provide a reconstructed video frame signal to a first and a second frame memories 240 and 260.

In the meantime, the controller 220 provides, in response to the header information from the VLD 201, a write and a read enable signals to the first and the second frame memories 240 and 260. Specifically, first, the controller 220 provides, in response to the header information, the write enable signal to the first frame memory 240, thereby causing the entire reconstructed video frame signal to be written in the first frame memory 240. After writing the entire reconstructed video frame signal in the first frame memory 240, the controller 220 provides continuously the read enable signal, instead of the write enable signal to the first frame memory 240 so that the reconstructed video frame signal from the first frame memory 240 is provided continuously to a display unit(not shown).

And, when the header information of the next frame is input from the VLD 201, the controller 220 provides the write enable signal to the second frame memory 260 so that a next reconstructed video frame signal is written in the second frame memory 260. After the next reconstructed video frame signal is written in the second frame memory 260, the controller 220 stops sending the read enable signal to the first frame memory 240 and provides the read enable signal to the second frame memory 260, thereby causing the reconstructed video frame signal from the second frame memory 260 to be provided to the display unit(not shown). This process is repeated with respect to the next reconstructed video frame signal. Therefore, the present reconstructed video frame signal continues to be displayed until the next reconstructed video frame signal is ready to be displayed.

As may be seen from the above, the encoding system in accordance with the present invention performs the quantization based on a predetermined quantizer scale without sacrificing the picture quality of an encoded video signal. Further, the inventive encoding system encodes and transmits a new video frame signal after a previous encoded video frame signal has been completely transmitted and, as a result, the encoded video signal can be transmitted without causing an overflow.

While the present invention has been described with respect to the particular embodiments, it will be apparent to those skilled in the art that various changes and modifications may be made without departing from the spirit and scope of the invention as defined in the following claims.

What is claimed is:

1. An encoding apparatus, for use in a video signal encoder, for encoding an input video signal, the input video signal including a plurality of video frame signals, comprising:

first storage means for sequentially storing the video frame signals on a frame-by-frame basis and, in response to a control signal, for providing a stored video frame signal;

means for transforming the stored video frame signal from the spatial domain into the frequency domain to provide transform data;

means for quantizing the transform data based on a predetermined quantizer scale to provide quantized transform data;

means for statistically coding the quantized transform data to produce an encoded video frame signal;

second storage means for temporarily storing the encoded video frame signal in order to transmit the encoded video frame signal at a constant transmission rate; and means for providing the control signal based on the encoded video frame signal to thereby enable a video frame signal, being stored in the first storing means at the moment when the transmission of the encoded video frame signal is completed, to be transformed at the transformation means.

2. The encoding apparatus according to claim 1, wherein said control signal providing means includes:

means for counting the total number of bits of the encoded video frame signal; and means for calculating the time of completing the transmission of the encoded video frame signal based on the total number of bits and the constant transmission rate and for providing the control signal based on the calculated time.

3. An encoding apparatus, for use in a video signal encoder, for encoding an input video signal, the input video signal including a plurality of video frame signals, comprising:

frame grabber means arranged to sequentially store at least one unencoded video frame signal, and provide said at least one unencoded video frame signal in response to a control signal;

coding means arranged to receive said at least one unencoded video frame signal from said frame grabber means and convert it into an encoded video frame signal;

frame buffer means arranged to receive said encoded video frame signal from said coding means, and then transmit the encoded video frame signal at a constant transmission rate B;

controller means arranged to calculate a time T that it takes to transmit the encoded video frame signal from the frame buffer means; and means for generating said control signal a time T after the frame buffer means begins transmission of the encoded video frame signal; wherein encoding of a subsequent unencoded video frame signal in the frame grabber means is suspended during transmission of the encoded video frame signal from the frame buffer means.

4. The encoding apparatus of claim 3, wherein said time T is calculated based on the number of bits in the encoded video frame signal, and the constant transmission rate B.

5. The encoding apparatus of claim 3, wherein said coding block comprises:

means for transforming the unencoded video frame signal from the spatial domain into the frequency domain to provide transform data;

means for quantizing the transform data based on a predetermined quantizer scale to provide quantized transform data; and means for statistically coding the quantized transform data to produce an encoded video frame signal.

* * * * *